(12) United States Patent
Niranjan et al.

(10) Patent No.: US 12,321,740 B2
(45) Date of Patent: Jun. 3, 2025

(54) UPGRADING MULTI-INSTANCE SOFTWARE USING ENFORCED COMPUTING ZONE ORDER

(71) Applicant: Salesforce, Inc., San Francisco, CA (US)

(72) Inventors: Dipankar Niranjan, San Francisco, CA (US); Varun Jobanputra, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 78 days.

(21) Appl. No.: 18/160,760

(22) Filed: Jan. 27, 2023

(65) Prior Publication Data

US 2024/0256269 A1    Aug. 1, 2024

(51) Int. Cl.
*G06F 9/44* (2018.01)
*G06F 8/658* (2018.01)

(52) U.S. Cl.
CPC .................. *G06F 8/658* (2018.02)

(58) Field of Classification Search
CPC ..................................... G06F 8/658
See application file for complete search history.

(56) References Cited

U.S. PATENT DOCUMENTS

| | | |
|---|---|---|
| 8,321,386 B1 | 11/2012 | Jobanputra |
| 8,595,237 B1 | 11/2013 | Chaudhary |
| 8,600,998 B1 | 12/2013 | Chaudhary |
| 8,819,383 B1 | 8/2014 | Jobanputra |
| 9,146,780 B1 | 9/2015 | Wijayaratne |
| 9,350,682 B1 * | 5/2016 | Gupta .................. G06F 9/45558 |
| 9,479,585 B1 | 10/2016 | Jobanputra |
| 2016/0191611 A1 * | 6/2016 | Srinivasan .............. H04L 67/10 709/201 |
| 2017/0364345 A1 * | 12/2017 | Fontoura ................... G06F 9/52 |
| 2020/0285627 A1 | 9/2020 | Baker |
| 2022/0029921 A1 * | 1/2022 | Rodriguez-Natal .... H04L 47/20 |
| 2023/0305876 A1 * | 9/2023 | Sharma ............... G06F 11/0793 |
| 2024/0036926 A1 * | 2/2024 | Fan .......................... G06F 9/54 |

\* cited by examiner

*Primary Examiner* — Hang Pan (74) *Attorney, Agent, or Firm* — Kowert, Hood, Munyon, Rankin & Goetzel, P.C.; Catherine L. Gerhardt; Dean M. Munyon (57) ABSTRACT

Techniques for preventing deadlock when upgrading a plurality of instances of a software service that is distributed across multiple different computing zones. Upgrade software executing on a cloud computer system receives an upgrade request to upgrade the plurality of instances. Respective upgrade processes are initiated in parallel. Node acquisition portions of the respective upgrade processes have a constraint on parallelization, as they are performed using a common upgrade procedure in which a given instance is upgraded by acquiring nodes in different ones of the computing zones according to a specified order. After acquiring the nodes according to the specified order, an updated instance is deployed to the acquired nodes to update the given instance. The acquiring of the nodes may be performed by node-securing pods in some embodiments, with the specified order enforced with affinity and anti-affinity rules.

20 Claims, 7 Drawing Sheets

Receiving, by a cloud computing system, an upgrade request to upgrade a plurality of instances, a given one of which is implemented across a plurality of computing zones
610

---

Performing, by the cloud computing system in response to the upgrade request, respective upgrade processes for the plurality of instances at least partially in parallel, wherein the respective portions of upgrade processes for the plurality of instances are performed using a node acquisition procedure in which a given instance is upgraded by securing nodes in different ones of the plurality of computing zones according to a computing zone order, wherein the upgrade process for a particular one of the plurality of instances includes:

Deploying, after acquiring the nodes in the different computing zones according to the specified computing zone order, an updated instance to the secured nodes to update the particular instance
630

UPGRADING MULTI-INSTANCE SOFTWARE USING ENFORCED COMPUTING ZONE ORDER

BACKGROUND

Technical Field

This disclosure relates generally to distributed software and, more specifically, to various mechanisms for performing upgrades of such software.

Description of the Related Art

Computer software services may often be implemented in a redundant manner, particularly in a cloud computing environment. For example, there may be multiple "instances" of a product such as the SALESFORCE database. Moreover, a given instance of a software service may be implemented in a distributed manner-thus a particular SALESFORCE database instance might run in multiple computing zones (e.g., in multiple availability zones within a particular region). These implementation details help guarantee availability for the software service.

Like other software products, distributed computing services will occasionally need to be upgraded. Upgrades may occur for a variety of reasons, including a configuration change or an update to a new version of software, which can include new functionality, address bugs, etc. Due to their complexity and the fact that the services being upgraded may be in production (i.e., are in live use by customers), distributed services may be difficult to upgrade while providing uninterrupted service, frequently across multiple computing zones.

Various upgrade methodologies have been devised to help ensure service availability. One such approach is referred to as the blue-green method. Using this paradigm, the existing software instance running on a first computing node is referred as the "blue" instance. Then, the updated software instance (the "green" instance) obtains a new node on which to run. Once the new node is obtained, the service transitions from the old, "blue" instance to the new, "green" instance. Subsequent requests for the service are then handled by the upgraded instance. The old, blue instance can then be freed for other uses. (The new, green instance will become the "blue" instance for a future upgrade.) This method helps ensure the continuous availability of the service.

DETAILED DESCRIPTION

Figure 1:
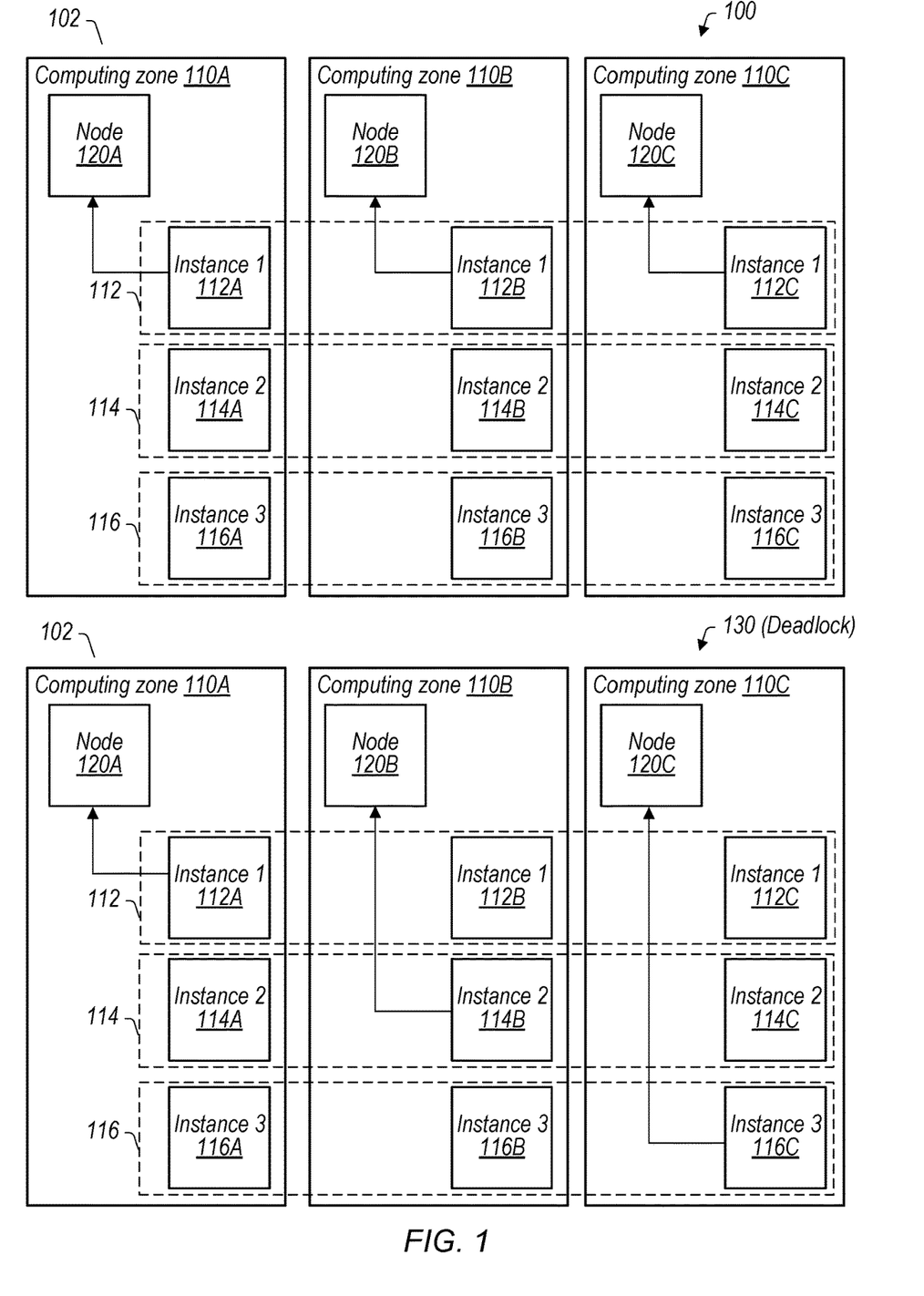
FIG. 1 is a block diagram that illustrates how multiple distributed instances of a software service might contend for nodes to perform a software upgrade.

To understand how multiple distributed instances of a software service might attempt to perform a software update, consider FIG. 1, which illustrates example scenarios 100 and 130. Both scenarios involve three instances of a software service running within a computer system 102: instance 1 (denoted with reference numeral 112), instance 2 (reference numeral 114), and instance 3 (reference numeral 116). Each of these instances is distributed, with a portion executing in each of three computing zones 110. Instance 112, for example, has a portion 112A executing in computing zone 110A, a portion 112B executing in computing zone 110B, and a portion 112C executing in computing zone 110C. In a similar manner, instance 114 includes portions 114A-C executing on each of computing zones 110A-C, while instance 116 includes portions 116A-C executing on each of computing zones 110A-C.

A "computing zone" is a broad term that refers to a set of computing resources that is managed distinctly from other sets of resources. Computing zones are isolated from failures in other computing zones, and are commonly used in cloud computing environments. For example, AMAZON WEB SERVICES (AWS) has computing regions that each include multiple "availability zones." An AWS availability zone is thus one example of a computing zone. A single computing zone might correspond to a data center in some implementations.

In example scenario 100, for a given instance of a software product (i.e., for one of instances 112, 114, and 116), one or more computing nodes need to be acquired in each computing zone in order to for an upgrade to occur. A "computing node" (also referred to herein as a "node") refers to compute power and resources from a computer system that are allocated or assigned to a computing zone. An AMAZON EC2 R5 node instance is one example of a "node," as that term is used in the present disclosure.

In scenario 100, three different instances (112, 114, and 116) of a software product are executing in a distributed manner in three different computing zones 110. The nodes on which these instance portions are currently executing are not pictured in scenario 100. For purposes of this example, for an upgrade of these instances to occur, each instance will need to acquire a node for each computing zone. Accordingly, nine nodes would need to be collectively available at the same time to computing zones 110A-C for the upgrades to all run in parallel. But suppose only three nodes (120A-C) are currently available to computing zones 110A-C. In such a case, one instance will have to acquire all three nodes to perform an upgrade. An example of this desired state is shown in scenario 100: instance portion 112A has acquired node 120A for computing zone 110A, instance portion 112B has acquired node 120A for computing zone 110B, and instance portion 112C has acquired node 120C for computing zone 110C. These three node acquisitions permit the upgrading of instance 112 to occur.

In many cases, computing nodes available to a particular computing zone may be in short supply due to their high performance or hardware cost. For example, a computing node with the properties required to run a high-performance database may have limited availability within a particular cloud computing environment. For example, enterprise applications such as SalesforceDB (SDB) typically need to run on high-end, memory-optimized public cloud instances.

To avoid any confusion over the generic term "instances," the present application primarily uses "instances" to refer to copies of the distributed software that are being executing (e.g., "instances of SDB" or "a plurality of instances of a service"), and generally uses "nodes" (or sometimes "node instances") to refer to the computing resources that are allocated to a computing zone (e.g., AWS public cloud instances). In one implementation, each SDB instance uses three AWS nodes: one is a read-write primary node and two are read-only replica nodes. Such a scenario calls for three node instances of the type r5d.24xlarge. Typically, availability of these nodes in a region is scarce, so for each new SDB instance that is to be deployed, planning is needed in order to ensure availability. Unfortunately, availability cannot always be guaranteed. This, when multiple instances are upgraded at the same time, this increases resource contention and can lead to undesirable outcomes.

A potential problem is shown in example scenario 130, which illustrates the same computing zones 110 and instances 112, 114 and 116 as in scenario 100. The requirement from scenario 100 that a given instance must acquire a node in all computing zones 110 also applies here. For the sake of simplicity, suppose that during the relevant upgrade time period, there are only three nodes 120A-C of the relevant type that are available for computing zones 110. Further, suppose that instances 112, 114, and 116 are all attempting, in at the same time, to acquire nodes 120A-C.

As shown, node 120A has been acquired for instance portion 112A in computing zone 110A. Node 120B has been acquired for instance portion 114B in computing zone 110B. Finally, node 120C has been acquired for instance portion 116C in in computing zone 110C. Scenario 130 thus illustrates a deadlock condition, since no instance can complete its corresponding upgrade-instance 112 cannot acquire nodes 120B-C, instance 114 cannot acquire nodes 120A and 120C, and instance 116 cannot acquire nodes 120A-B. The upgrade processes for instances 112, 114, and 116 would thus stall until a forced reset or a timeout condition is reached, at which time the upgrade process would have to be retried. There is no guarantee that a further deadlock would not occur.

Note that when a blue-green deployment scheme is being used, there will, for a period of time, be twice the number of nodes in use as during normal operation. This paradigm will thus exacerbate the issue when there is node scarcity. In many cases, cloud providers frequently reject requests for scarce resources. Although this problem is most commonly encountered for high-end node types, it can technically happen for any node type.

A common approach to avoiding deadlock when upgrading multiple instances of a software service is to upgrade the services serially (e.g., upgrade instance 1, then instance 2, etc.). This methodology, however, is not always practical. Upgrades for complex software products, such as databases, can be long-running, and therefore are often performed during off-peak hours (e.g., at night) in order to minimize customer disruptions.

The inventors have recognized that multiple instances of distributed software executing in multiple computing zones can be upgraded more efficiently by performing the upgrades of the multiple instances mostly in parallel, using constraints on parallelization during the node acquisition process to prevent deadlock.

As will be described below, this objective can be achieved by forcing the upgrade process for each instance of a software service to operate according to a common computing zone order for node acquisition. If there are three computing zones A, B, and C, for example, the computing zone order might be A→B→C. This ordering, which can be passed to the upgrade pipeline for each instance as a shared parameter, can be used to prevent deadlock. This ordering can be used, for example, to instruct an upgrade process that a node cannot be acquired for computing zone B unless a node has first been acquired for computing zone A. Similarly, a node cannot be acquired for computing zone C unless a node has first been acquired for computing zone B. Such requirements will prevent deadlock scenario 130. Instances 114 and 116 would be prevented from acquiring nodes 120B-C because those instances have not first acquired a node in computing zone 110A.

This paradigm has advantages in addition to preventing deadlock. The disclosed solution is portable, as it works with all cloud vendors. It also works with all node types. The solution does not add any significant time to an already long-running upgrade procedure. Further, it does not incur any downtime for the customer, and works for exactly the number of on-demand nodes that are available, as well not requiring more resources than strictly needed. This avoids having to preemptively acquire (and thus pay for) nodes that may or may not be used.

Figure 2:
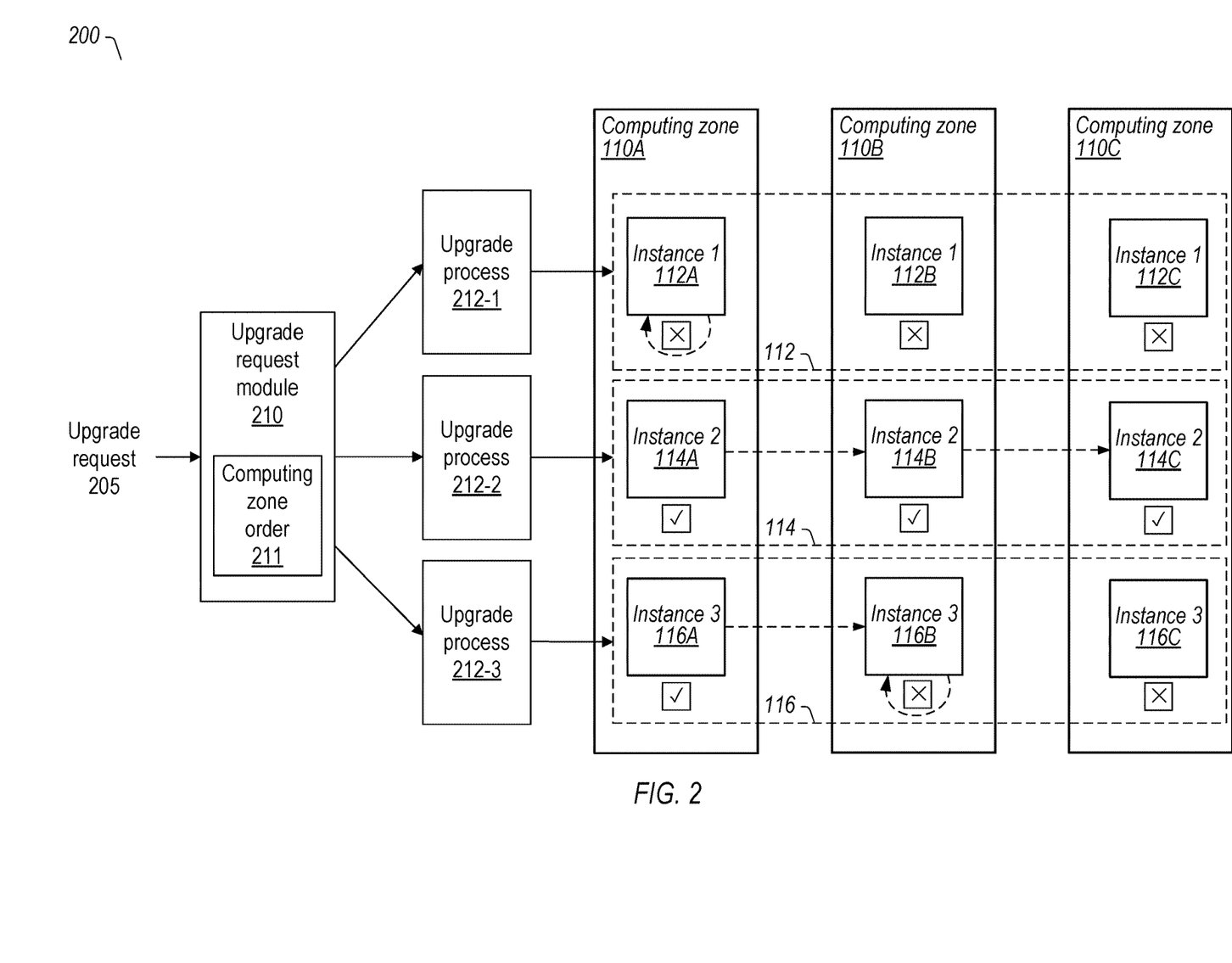
FIG. 2 is a block diagram that illustrates an embodiment of how multiple distributed instances of a software service can perform a software upgrade.

FIG. 2 is a block diagram of a computer system 200 for preventing deadlock while upgrading multiple instances of distributed software. As shown, system 200 includes upgrade request module 210 and instance upgrade processes 212 (212-1, 212-2, and 212-3). Upgrade processes 212 are each responsible for a separate instance of a software service, each of which is distributed across multiple computing zones 110A-C. Computing zones 110 may be different zones within a single geographic region or within multiple geographic regions (e.g., 110A and 110B may be located in a US-West region, while 110C may be located in a US-East region).

In the illustrated embodiment, upgrade request module 210 receives upgrade request 205. In some embodiments, upgrade request 205 could be automatically generated by developers of instances 1-3 pushing new code to a distributed version control system (e.g., Git), but in other embodiments, it could be sent by a developer operations (DevOps) team after receiving updated code for instances 1-3. In response to request 205, module 120 can initiate respective upgrade processes 212 to upgrade different instances of a software service. In the depicted embodiment, three upgrade processes are initiated to upgrade three different instances of a service: upgrade process 212-1 (for upgrading instance 1), upgrade process 212-2 (for upgrading instance 2), and upgrade process 212-3 (for upgrading instance 3). As shown, these instances are distributed across multiple computing zones 110. Module 210 may initiate a different number of upgrade processes 212 depending on the number of software service instances that need upgrading. In some cases, the number of instances can be quite large, making contention scenarios more likely, especially with a limited number of available computing nodes. In some embodiments, upgrade processes 212 may be initiated by a continuous delivery platform such as SPINNAKER.

Upgrade processes 212 themselves may also be executed by a platform such as SPINNAKER. As will be described in FIG. 3A, each upgrade process 212 performs a series of functions (i.e., a pipeline) that handles the upgrading of a particular software instance. In some implementations, one part of the upgrade process is acquiring (or securing) computing nodes in the various computing zones in which the instance is currently executing. Portions of upgrade processes 212 are permitted to operate in parallel, but certain portions, including those related to node acquisition have parallelization constraints. This approach avoids potential deadlock conditions that result from contention for scarce computing nodes.

Upgrade request module 210 is executable to pass (or cause to be passed) certain operating parameters/specifications to each upgrade process 212. In some cases, upgrade processes 212 might receive different information values (in particular, information that differs between the instances being upgraded). In other cases, all processes might receive a common parameter. For example, consider computing zone order information 211. This information, which can be expressed in various forms, specifies an ordering of computing zones for which nodes are to be acquired. The computing zone order might be A→B→C in one implementation. Computing zone order information 211 is thus a parallelization constraint, as this information is used by all of upgrade processes 212 to serialize, when necessary, when nodes are requested for certain computing zones. For example, a particular upgrade process 212 cannot secure a node in computing zone 110B before first securing a node in computing zone 110A.

The dissemination of computing zone order information 211 to all current upgrade processes 212 is usable to prevent deadlock amongst these processes. Once initiated, upgrade processes 212-1, 212-2, and 212-3 begin operation in parallel. During the upgrade process, each process will reach a pipeline stage in which it attempts to acquire a node in computing zone 110A (the first computing zone specified by computing zone order 211). Information 211 can be used to ensure that no attempt is made by the upgrade processes to acquire a node in zones 110B or 110C before an attempt is made to acquire a node for zone 110A.

As illustrated by FIG. 2, upgrade processes 212-2 and 212-3 succeed in each acquiring nodes for use by zone 110A (as indicated by check marks below instance portions 114A and 116A). Because a third node is not available in 110A, upgrade process 212-1 stalls until such time as a node does become available in zone 110A (as indicated by an X and the circular arrow below instance portion 112A). Again, given the failure for zone 110A, upgrade process 212-1 will not attempt to acquire nodes for zones 110B and 110C at this point. Meanwhile, upgrade processes 212-2 and 212-3, having succeeded with respect to zone 110A, each attempt to acquire respective nodes for computing zone 110B. As shown, process 212-2 successfully acquires a node, while process 212-3 does not. Accordingly, process 212-3 stalls until such time as a node becomes available in zone 110B. Upgrade process thus does not attempt to acquire a node in computing zone 110C.

On the other hand, upgrade process 212-2, having succeeded in node acquisition with respect to zone 110B, successfully acquires a node in zone 110C. Because nodes have been acquired in all computing zones 110 in which instance 2 is executing, upgrade process 212-2 is then free to perform subsequent steps to complete the upgrade process. Processes 212-1 and 212-3, meanwhile, will stall until nodes can be acquired in the remaining computing zones. As will be discussed, once instance 2 has fully completed upgrading, it may release nodes associated with the old version of the instance in each of zones 110. These released nodes might subsequently be acquired by instances 1 and 3. (Instances 1 and 3 could of course acquire any available node, whatever their previous use.) Due to the use of zone order information 211, instances 1 and 3 should eventually acquire nodes in all computing zones 110 in which they are executing. As such, all upgrade processes 212 will eventually complete, allowing all instances to be replaced with upgraded versions.

Figure 3A:
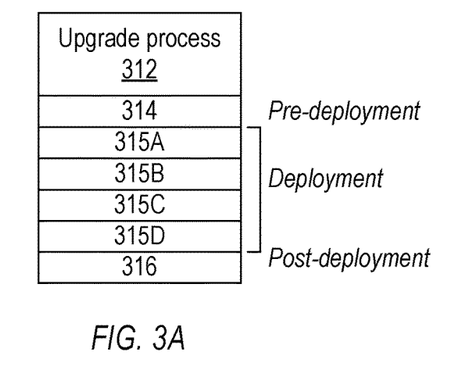
FIG. 3A is a block diagram illustrating different stages of one embodiment of a pipeline of an upgrade process for a software instance.

Turning now to FIG. 3A, an example implementation of an upgrade process for a software instance is shown. As used herein, an "upgrade process" does not necessarily refer to a single computer process that is scheduled by an operating system to execute on a processor circuit. Instead, "upgrade process" refers to a series of steps (or pipeline stages) that are performed in order to upgrade a software instance. The precise form of upgrade process 312 (and thus the means of executing this process) can vary. Upgrade process 312 might consist of an orchestration module that initiates various pipeline stages. For example, in one embodiment, upgrade process 312 can be managed and performed by a continuous delivery platform such as SPINNAKER. In other embodiments, upgrade process 312 might be implemented as a script configured to linearly run all functions of an upgrade process. Whatever the form, upgrade process 312 can receive various parameters, including computing zone order information 211, in order to facilitate the upgrade.

Upgrade process 312 can have a variety of stages. For purposes of FIG. 3A, these stages are labeled as 314 (pre-deployment), 315 (deployment), and 316 (post-deployment). As used herein, "deployment" refers to a portion of the upgrade process in which new node acquisition and node changeover occurs. As has been discussed, deployment stages 315 might implement a blue-green deployment paradigm in some embodiments. Note that reference numerals 314, 315, and 316 can each include multiple individual stages of the pipeline. For example, the deployment stages in FIG. 3A includes stages 315A-D. In some pipeline embodiments, there may not be any post-deployment stages 316.

As has been described, in order for a distributed software instance to be upgraded, nodes to execute the new software are to be acquired in each computing zone in which the instance is executing. Accordingly, in some embodiments, deployment stages 315 can include a node acquisition stage for each computing zone in which the instance is currently executing. These stages are indicated by reference numerals 315A-C in FIG. 3A. Stage 315A acquires a node for computing zone 110A, while stages 315B and 315C acquire nodes for computing zones 110B and 110C, respectively. Note that different instances of a software product might be running in different numbers of computing zones, and thus the corresponding upgrade pipelines might have different numbers of node acquisition stages. Deployment stages 315 can also include a node switchover stage, which is indicated by reference numeral 315D. In this stage, which is reached after nodes are acquired for all of an instance's computing zones, the software begins running from the newly acquired nodes in each computing zone, with the previous node being released. Deployment stages 315 may be performed using a container management software system such as KUBERNETES in some embodiments. The upgrade can then complete with any required post-deployment stages 316.

Ideally, the upgrade processes 312 would be able to execute fully in parallel. (As used herein, processes running "in parallel" means that the time windows in which the processes are executing overlap in time, at least partially.) But as noted with respect to scenario 130, traditional parallel execution can lead to deadlock. The inventors had the insight that upgrade performance could be improved by allowing most pipeline stages of upgrade processes for various instances to execute in parallel without restrictions, and that other pipeline stages, namely those related to node acquisition, could also be parallelized with certain constraints. For example, the use of computing zone order information 211 by node acquisition stages 315A-C can be used to avoid deadlock. This allows for at least partial parallelization of node acquisition stages. As will be described with respect to FIGS. 3B-D, the extent to which node acquisition stages 315A-C can be parallelized is dependent on the number of nodes available in each computing region during the upgrade process. Stated another way, the node acquisition stages can be conditionally parallelized.

Figure 3B:
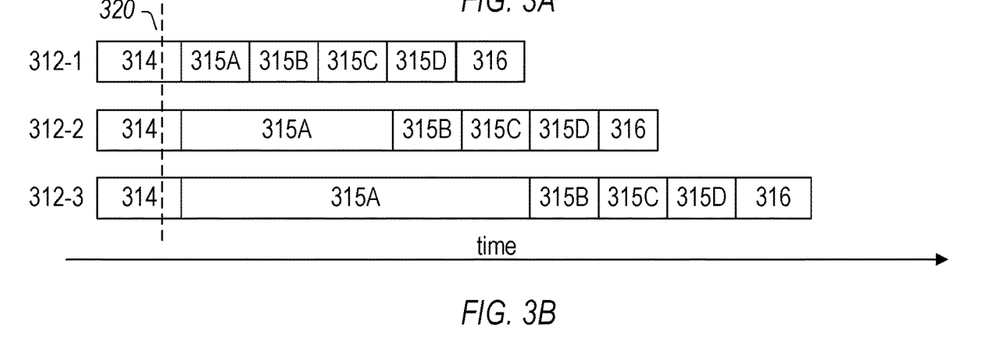
FIGS. 3B-D are timing diagrams illustrating different amounts of parallelization that may be achieved during an instance upgrade when enforcing a computing zone order, according to the disclosed embodiments.

FIG. 3B is a graph depicting the execution of three upgrade processes, 312-1, 312-2, and 312-3 at a time when nodes are quite scarce. The horizontal axis represents time, and the inclusion of pipeline stages across this horizontal access indicates times at which various pipeline stages are being performed. Accordingly, portions of FIG. 3B in which pipeline stages of different upgrade processes 312 are shown directly on top of one another indicates that these processes are executing in parallel. Note that in FIGS. 3A-C, the computing zone order is A→B→C.

FIG. 3B shows pre-deployment stages 314 for the three upgrade processes all executing in parallel. (The line indicated by reference numeral 320 represents one such point in time.) Node acquisition stages 315A-C, on the other hand, are shown as being performed serially as between different upgrade processes 312. This is due to the parallelization constraint enforced by computing zone order information 211.

In FIG. 3B, stage 315A for each upgrade process 312 begins executing at the same time in an attempt to acquire a node for computing zone 110A. Given current node scarcity in this example, only one upgrade process, 312-1, is successful in acquiring a node for zone 110A. (Node acquisition success for a stage in FIGS. 3A-C is shown by the beginning of the next stage.) Note that stages 315A for all upgrade processes are not permitted to acquire a zone that is further along in computing zone order 211, and stages 315A for processes 312-2 and 312-3 stall until a node becomes available in zone 110A. Stages 315B and 315C, which are constrained to nodes for zones 110B and 110C, respectively, are not permitted to begin attempting to acquire nodes until their respective preceding stage 315A has successfully completed.

Note that, in some embodiments, stage 315B can technically be launched at the outset or during the execution of preceding stage 315A, but stage 315B still would not be able to request node acquisition until stage 315A completes successfully. A similar relationship exists between stages 315B and 315C.

The result in FIG. 3B is that upgrade processes 312-1, 312-2, and 312-3 have very little parallelism with respect to node acquisition stages 315A-C. In effect, these stages execute serially: stages 315A-C first execute for upgrade process 312-1, followed by the stages for upgrade processes 312-2 and 312-3.

Figure 3C:
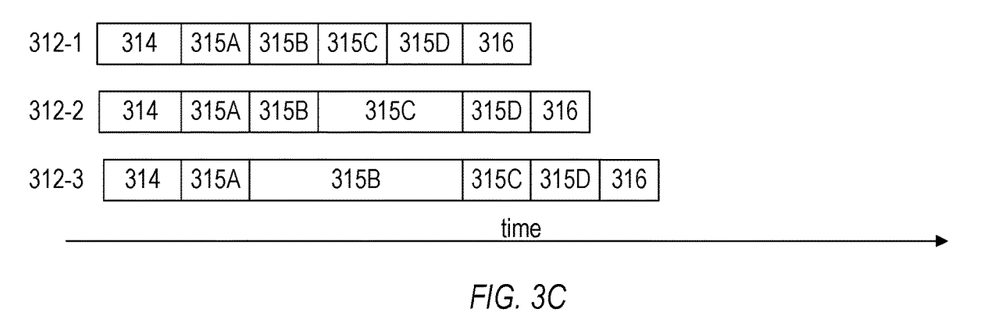

FIG. 3C depicts a scenario in which there is a greater amount of node availability than in FIG. 3B. As can be seen in FIG. 3C, all three upgrade processes are immediately able to acquire nodes for computing zone 110A, but only processes 312-1 and 312-2 manage to acquire nodes for computing zone 110B. Similarly, process 312-1 manages to acquire the only available node in computing zone 110C, forcing process 312-2 to stall. Similarly, process 312-3 stalls to await node availability for computing zones 110B-C. This example thus shows a partial parallelization of node acquisition stages 315A-C between upgrade processes 312-1, 312-2, and 312-3, resulting in a reduced upgrade time.

Figure 3D:
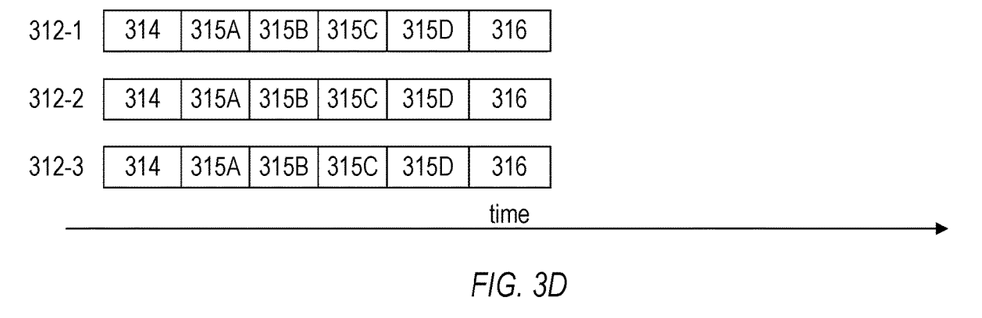

FIG. 3D depicts a scenario in which computing zones 110 have sufficient node availability to permit all three upgrade processes 312 to perform node acquisition in parallel in all computing zones with no waiting time. In such a case, the node upgrade process, including node acquisition processes, can be fully parallelized. This results in an even faster upgrade time compared to the scenario of FIG. 3C.

The disclosed use of computing zone order enforcement for node acquisition thus has the advantage of being able to adapt to different conditions of node availability. When nodes are sufficiently available, the node acquisition process can achieve a high degree of parallelism. On the other hand, when nodes are scarcer, an appropriate degree of serialization can be implemented to avoid deadlock. Accordingly, the goal is to try to use all the node capacity available at that time in order to avoid time-consuming serial executions (retries), while at the same time not making requests for too many nodes, which can lead to failures due to deadlocks. Theoretically, it would be possible to be able to query the cloud provider in order to know current node capacity before making requests, but the cloud provider, in order to maintain their competitive edge, typically do not want to reveal beforehand how many nodes are available.

Figure 4A:
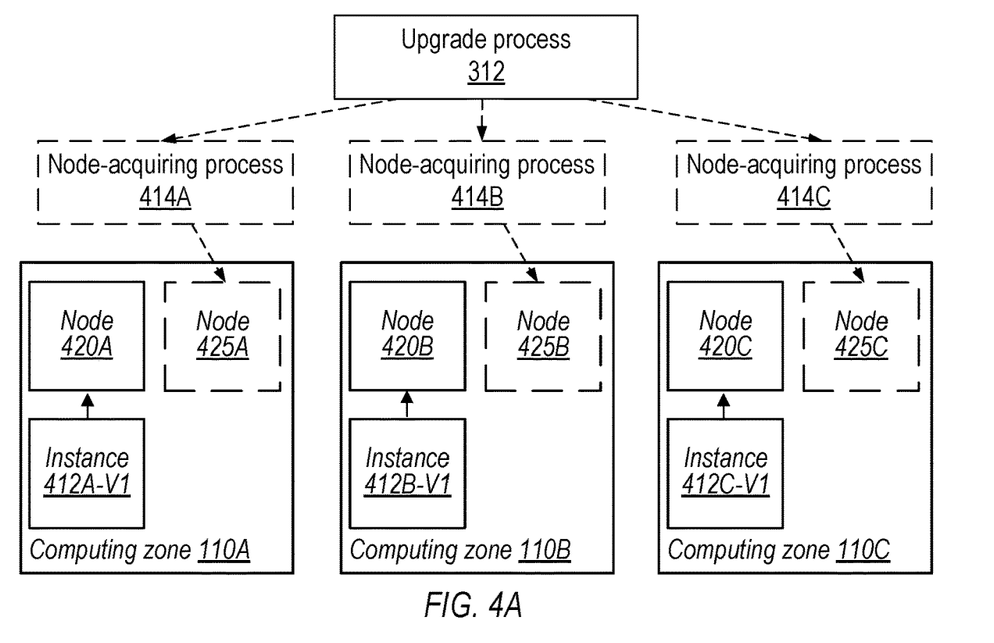
FIG. 4A-C are block diagrams illustrating steps of an example upgrade process in which a software instance is upgraded from a current version to a newer version.
Figure 4B:
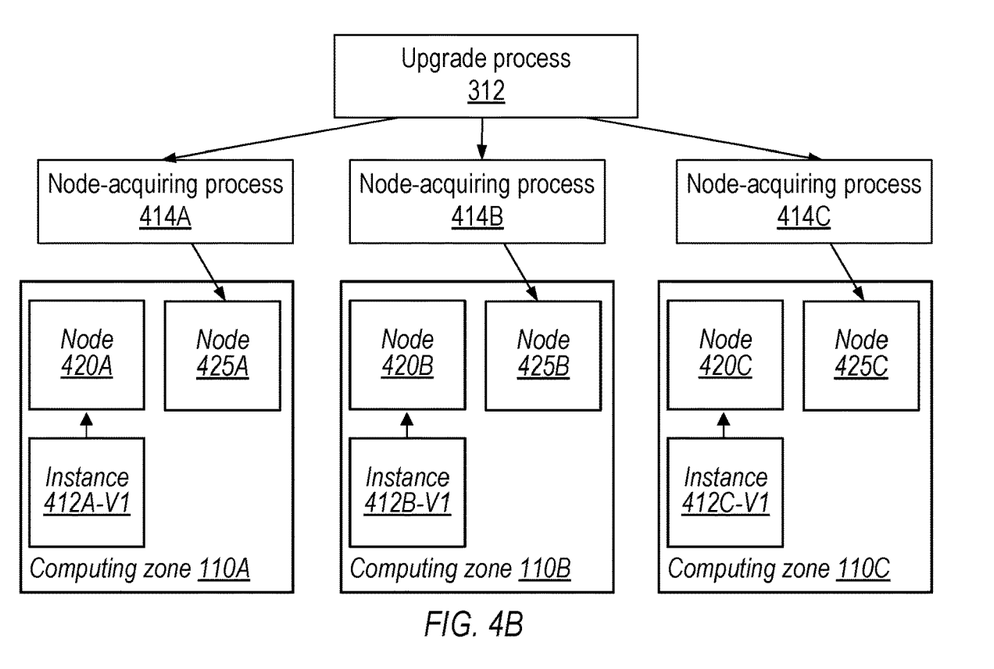
Figure 4C:
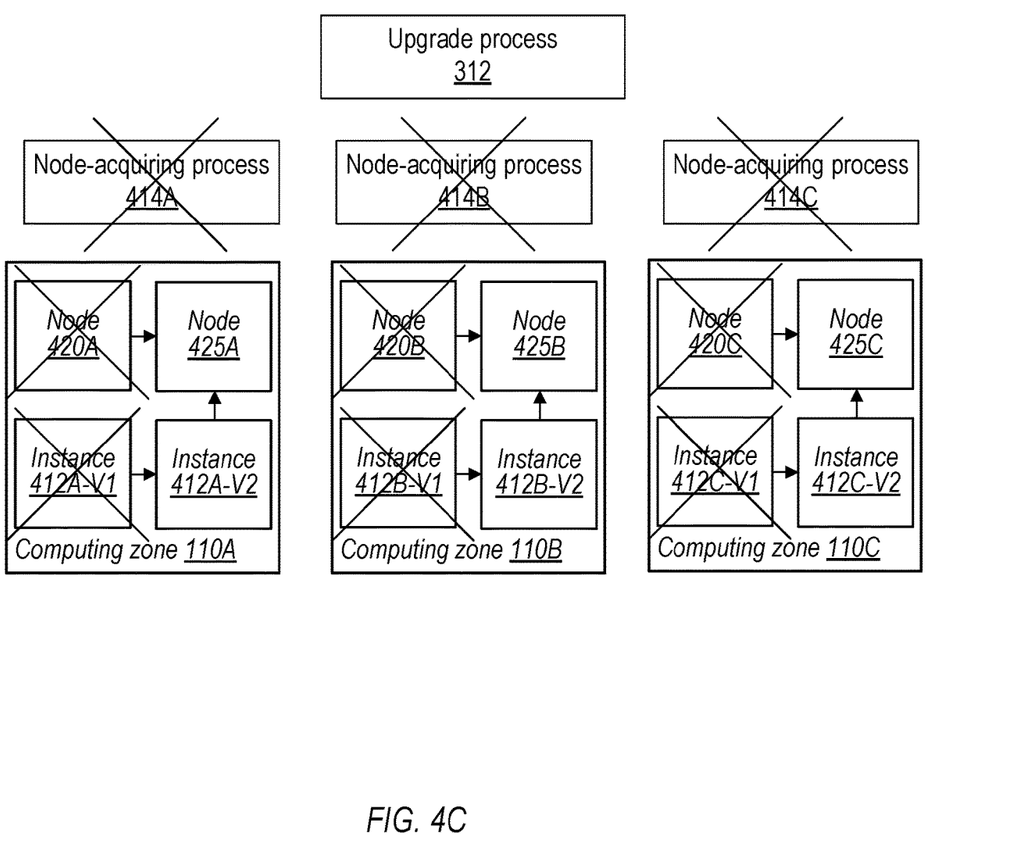

FIGS. 4A-C are block diagrams further illustrating an upgrade process 312 that utilizes a blue-green deployment paradigm in which a software instance 412 is upgraded from a current version 412-V1 to a newer version 412-V2.

FIG. 4A depicts the state of software instance 412 at the time an upgrade is requested. Version 412-V1 has three portions executing in three computing zones 110A-C. One or more other instances of the same software (not pictured in FIG. 4A) are also executing on one or more of these same computing zones. The goal is to acquire one or more nodes (as required by the needs of the software instance) in each computing zone 110. These desired nodes are shown in FIG. 4A with a dotted line.

FIG. 4B depicts the launching of processes to acquire the desired nodes. During the node acquisition portions of the instance's upgrade pipeline 312 (e.g., 315A-C), upgrade process 312 initiates (or causes to be initiated) node-acquiring (or node-securing) processes 414A-C whose purpose is to acquire nodes in each computing zone 110. Node-acquiring processes 414A-C can be initiated in various ways. For example, these processes may be launched by a container management system. As used herein, a "container management system" refers to a software platform that facilitates the use of software containers. As is understood in the art, a software container is a package for software that contains the software and all the elements required for software to run in any environment. KUBERNETES is an example of a container management system.

The order of execution of these node-acquiring processes follows the computing zone order 211 (not shown) that has been provided to upgrade process 312 as a parameter. Node-acquiring process 414A is launched first and stalls until a node is available for allocation to computing zone 110A. After node-acquiring process 414A acquires node 425A for computing zone 110A, node-acquiring process 414B is launched and stalls until acquiring a node 425B for computing zone 110B when such a node is available. At that point, node-acquiring process 414C is launched, stalling until acquiring a node 425C for computing zone 110C. When nodes are acquired for all computing zones, as depicted in FIG. 4B, a node switchover can occur.

FIG. 4C depicts this switchover process for instance 412A once nodes have been acquired for all computing zones. New version 412-V2 is created and installed on the newly acquired nodes, and thus can begin executing. In a blue-green update paradigm, traffic to the software instance is rerouted from version 412-V1 to version 412-V2 (and thus from the existing nodes 420 to the newly acquired nodes 425). Once version 412-V2 is fully operational and running, node-acquiring processes 414A-C and versions 412-V1 can be terminated, and nodes 420 all releases. In some cases, the release of these nodes might free up resources that can be used by other instances in that are waiting during the acquisition stages of their own upgrade processes. The switchover process may be identical in each of the three computing zones and may be done in parallel.

The disclosed techniques are not necessarily limited to facilitating a blue-green update paradigm. For example, in a canary upgrade paradigm requiring acquiring additional nodes, version 412-V1 and new version 412-V2 of the instance may initially run simultaneously, servicing different requests, with each instance running on a respective node in each of the instance's computing zones. Traffic is then gradually rerouted from version 412-V1 to version 412-V2, as opposed to the blue-green method in which traffic is rerouted in full all at once.

Figure 5A:
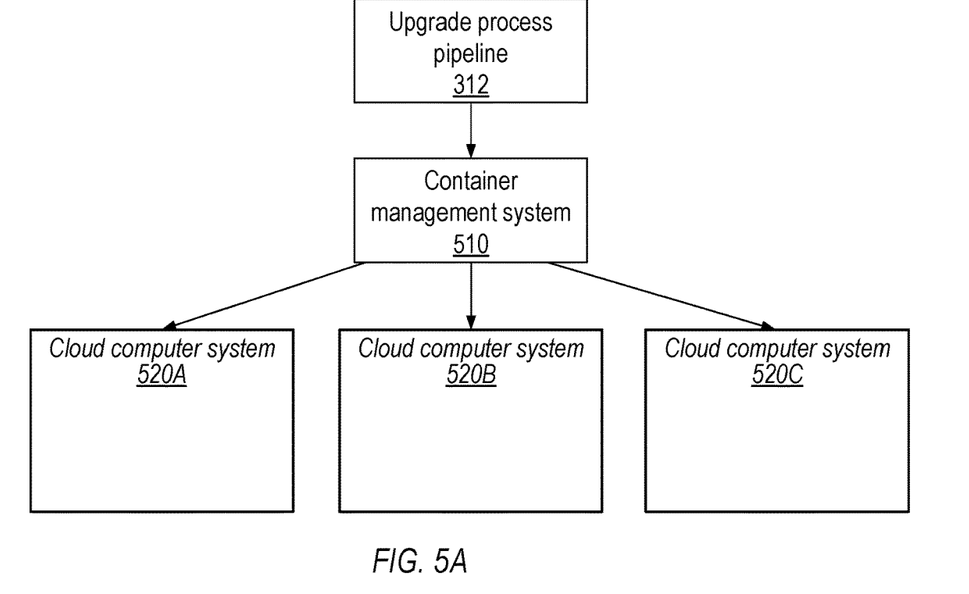
FIG. 5A is a block diagram of one embodiment of an upgrade process pipeline communicating with a container management system to communicate with different cloud computer systems.

As has been noted, upgrade process 312 may utilize a container management system. This relationship is depicted in FIG. 5A, in which a block diagram of upgrade process 312 communicates with container management system 510. In some embodiments, upgrade process 312 can be managed by a continuous delivery software system such as SPINNAKER, while container management system 510 may be KUBERNETES.

FIG. 5A also illustrates that container management system 510 is executable to communicate with different cloud computer systems 520A-C operated by different vendors— for example, AWS, MICROSOFT AZURE, IBM CLOUD, etc. Each of these cloud computer systems has its own internal organization, APIs, resource types, and protocols for operations like resource acquisition. In many cases container management system 510 is already executable to communicate with different cloud computer systems 520. This means that the disclosed upgrade methodology can be implemented via information passed to container management system 510, with the result that the computing zone order 211 can be enforced without any interaction between the DevOps team and the APIs of a particular cloud computer system 520. The disclosed solution can thus be implemented without any requirements for special cases for different cloud vendors, advantageously resulting in portability.

Figure 5B:
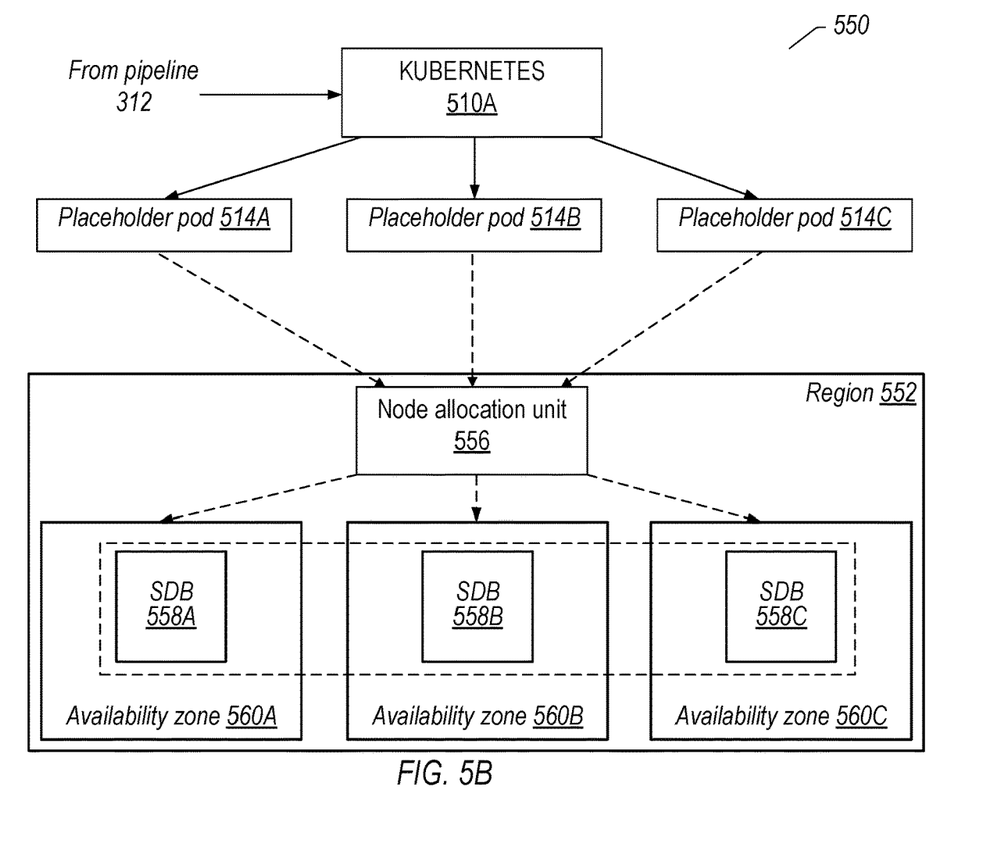
FIG. 5B is a block diagram of one embodiment of a container management system configured to perform a software upgrade of distributed instances of a software service.

FIG. 5B is a block diagram illustrating a specific example in which KUBERNETES is utilized as container management system 510. As shown, computer system 550 includes KUBERNETES, indicated by reference numeral 510A, interacting with an AWS geographic region 552. (Other possible AWS geographic regions are not depicted in FIG. 5B.) Region 552 includes AWS availability zones 560A-C, each isolated from the other availability zones (AZs), such that one AZ is resilient to the failure of another AZ.

In the particular example shown, AWS region 552 includes node allocation unit 556, which allocates resources to availability zones with region 552. Accordingly, in this embodiment, zones 560 are all competing for a common pool of node resources within region 552. Portions of an instance 558 of a software product (558A-C) are running on respective ones of availability zones. In some embodiments, node allocation unit 556 is an instance of the Amazon Elastic Kubernetes Service (EKS).

In this example, instance 558 is the SALESFORCE database (SDB), and there is a 3-AZ requirement. Accordingly, in this example, SDB needs one node from each of three different AZs 560A-C. SDB runs on these three nodes simultaneously, making it resilient to AZ-level failures. SDB in this example has been deployed via KUBERNETES with what is known as a StatefulSet environment, meaning that it is suitable for applications that desire to maintain state. Although not explicitly depicted, the SDB StatefulSet environment in this example has 3 pods, one for each AZ 560. A "pod" is the smallest deployable object in KUBERNETES. A pod contains one or more containers (e.g., DOCKER containers). When a pod runs multiple containers, the containers are managed as a single entity and share the pod's resources.

Within the particular example shown in FIG. 5B, it is not possible to bind a StatefulSet pod of SDB via KUBERNETES such that it will acquire nodes only from a specific AZ. Accordingly, computer system 550 utilizes placeholder pods 514A-C, which do not have the same AZ limitations that StatefulSet pods have. As will be described below, pods 514A-C can be bound to particular AZs. Accordingly, when an SDB instance needs to be upgraded, it will first deploy placeholder pod 514A, which will communicate with node allocation unit 556 to try to acquire a node for AZ 560A, and not any other AZ. Only once pod 514A is successful will KUBERNETES deploy pod 514B, which will similarly request a node for AZ 560B (and only AZ 560B). If pod 514A is unable to acquire a node in AZ 560A, it just stalls until it is available. Furthermore, only once pod 514B acquires a node for AZ 560B, will pod 514C try to acquire a node for AZ 560C (and only AZ 560C). If the other deployed SDB instances (not depicted in FIG. 5B) follow this procedure, then there is no possibility of a node deadlock. The binding of placeholder pods to specific AZs 560 is shown via dotted lines in FIG. 5B (e.g., from pod 514A through node allocation unit 556 to AZ 560A).

Placeholder pods 514 can be bound to acquire nodes for specific AZs 560 through rules based on computing zone order information 211. In the context of KUBERNETES for example, pods 514 can be bound to specific AZs 560 using node affinity rules and/or pod anti-affinity rules. Node affinity rules can be used in KUBERNETES to specify that the node secured has to be in a specific computing zone/availability zone and of the same node type that is compatible with the application being upgraded. Pod anti-affinity rules in KUBERNETES, on the other hand, can be used to prevent the creation of a placeholder pod if the software being upgraded already has another placeholder pod in the computing zone. Accordingly, these rules can be used in a KUBERNETES environment to ensure that each AZ has one placeholder pod, and that the pod is restricted to acquiring nodes from a specific AZ.

Figure 6:
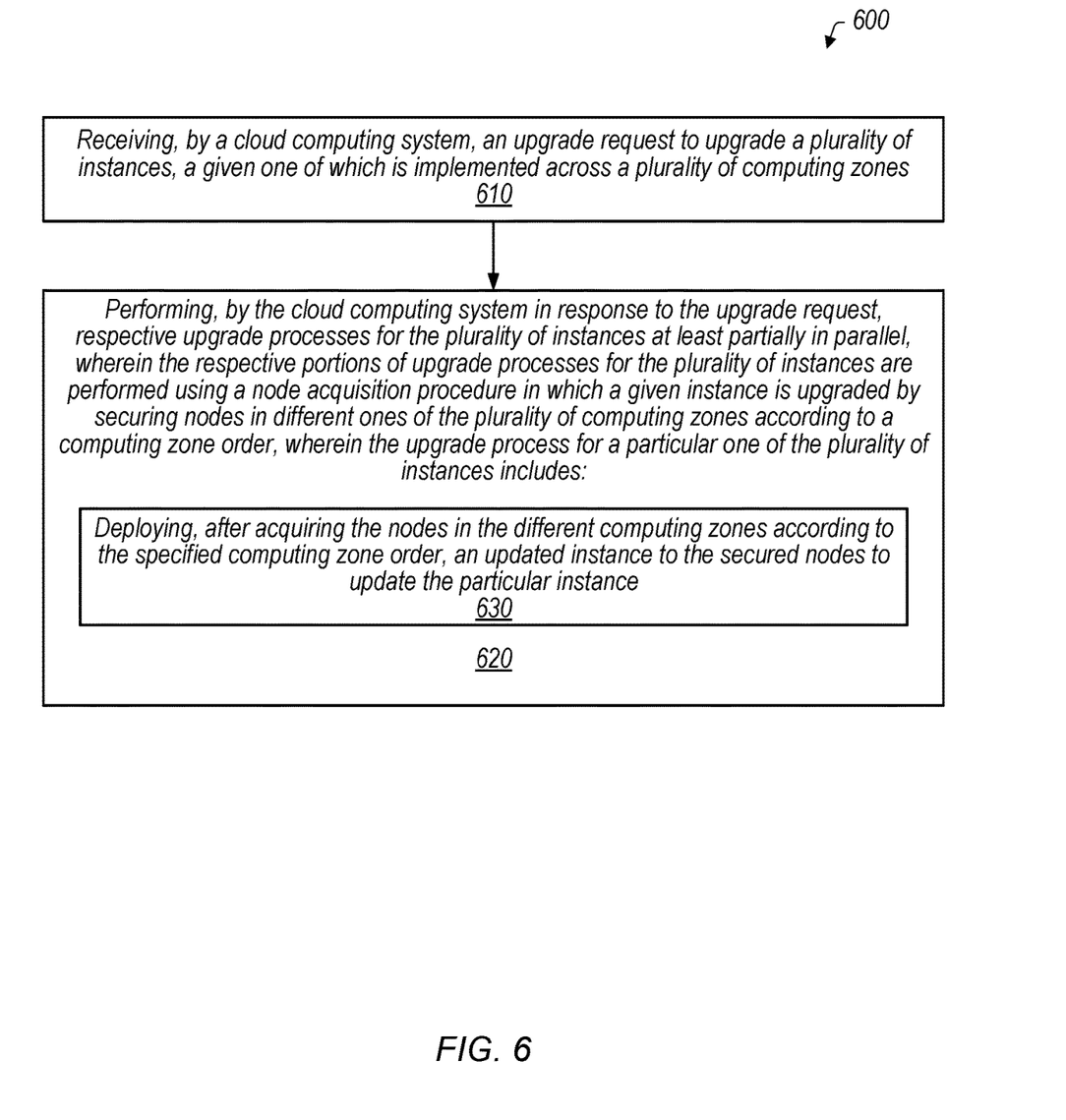
FIG. 6 is a flow diagram illustrating one embodiment of a method for performing an upgrade of multiple instances of distributed software.

Turning now to FIG. 6, a flow diagram of a method 600 is shown. Method 600 is one embodiment of a method performed by a computer system to upgrade a plurality of instances. Method 600 may be performed by executing a set of program instructions stored on a non-transitory computer-readable medium.

Method 600 begins in step 610, during which the computing system (e.g., system 200) receives an upgrade request (e.g., upgrade request 205) to upgrade a plurality of instances (e.g., instances 112-116). A given one of these instances is implemented across a plurality of computing zones (e.g., computing zones 110). For example, the plurality of instances could include instances A and B, both of which are implemented in at least two computing zones—the plurality of instances could also include an instance C that is implemented in the same two computing zones in addition to another computing zone. Computing zones may have different topologies according to their cloud computing system. In some embodiments, the plurality of computing zones includes a first plurality of computing zones in a first cloud region and a second plurality of computing zones in a second cloud region.

Method 600 may be implemented using various types of software products. In some embodiments, performing the respective upgrade processes is managed by a continuous delivery platform, and acquiring of the nodes in the different computing zones for the particular instance is performed by a container management system. The container management system may, in some cases, launch separate computing environments to acquire respective nodes for each of the plurality of computing zones. Further, the container management system may be configured with rules are specified for the separate computing environments that enforce the computing zone order. In some embodiments, the container management system is KUBERNETES the separate computing environment are node-securing placeholder pods that are not stateful, and the rules include affinity rules and anti-affinity rules.

In step 620, the cloud computing system performs, in response to the upgrade request, respective upgrade processes (e.g., upgrade processes 212) for the plurality of instances. These upgrade processes are performed at least partially in parallel, where respective portions of upgrade processes for the plurality of instances are performed using a node acquisition procedure in which a given instance is upgraded by securing nodes in different ones of the plurality of computing zones according to a computing zone order (e.g., computing zone order 211). Thus, each of the instances acts according to the computing zone order. In some embodiments, the node acquisition procedure is part of a blue-green deployment in which a set of existing nodes for the particular instance are deactivated after deploying the updated instance. Alternately, step 620 could constitute initiating respective upgrade processes for the plurality of instances responsive to the upgrade request. The initiating could include passing the computing zone order as a parameter to each of the respective upgrade processes.

The upgrade process may vary depending on the computing system and instance configuration. The upgrade process may, for example, include a first upgrade process for a first of the plurality of instances and a second upgrade process for a second of the plurality of instances, and the computing zone order may specify a first computing zone, followed by a second computing zone, followed by a third computing zone. In this example, the first and second upgrade processes each cannot 1) acquire one or more nodes in the second computing zone until acquiring one or more nodes in the first computing zone or 2) acquire one or more nodes in the third computing zone until acquiring one or more nodes in the second computing zone.

In some embodiments, the computing zone order specifies a constraint on parallelization for those portions of the respective upgrade processes that implement node acquisition, but other portions of the upgrade processes are able to be performed in parallel without such constraints. But the manner in which the constraint on parallelization specified by the computing zone order is implemented may, in some cases, permit full parallelization of portions of the respective upgrade processes that implement node acquisition when there is no contention for nodes in the plurality of computing zones.

In step 630 (which can be considered part of step 620), the cloud computing system deploys, after acquiring the nodes in the different computing zones according to the computing zone order, an updated instance to the secured nodes to update the particular instance.

There are many variations of method 600. One such method begins with receiving an upgrade request to upgrade a plurality of instances, a given one of which is implemented across a plurality of computing zones. In some cases, the respective upgrade processes implement a blue-green deployment scheme in which existing nodes in the plurality of computing zones are deactivated upon an updated instance being deployed. In some embodiments, the plurality of computing zones includes separate data centers.

The method further includes, in response to the upgrade request, initiating respective upgrade processes for the plurality of instances, where the respective upgrade processes include a node acquisition portion having a common constraint on parallelization in which nodes for a given one of the plurality of instances are to be acquired in different computing zones according to a specified order. This acquisition may be configured using specialized software. For example, one or more nodes for a given computing zone and instance are acquired using a dedicated process, where the dedicated process is executable to stall until a sufficient number of nodes are available for assignment to the given computing zone. This dedicated process may be, in some cases, a node-securing pod of a container management system, where the dedicated process is a node-securing pod of a container management system with the specified order being enforced via affinity and anti-affinity rules.

Then, after acquiring the nodes in the different computing zones according to the specified order, the operations may further comprise deploying an updated instance to the acquired nodes to update the given instance.

A more specific variation of method 600 is applicable to an environment similar to that depicted in FIG. 5B, which utilizes a container management system such as KUBERNETES in conjunction with an AWS cloud storage system. In one such possible method, a computer system (e.g., system 550) receives a request to upgrade a plurality of instances (e.g. instances 558A-C) of a service (e.g. SDB 558) that is distributed across a plurality of availability zones (e.g. availability zones 560) that includes a first availability zone (e.g., availability zone 560A) and a second availability zone (e.g., availability zone 560B) within a particular cloud region (e.g. region 552).

Then, the computer system causes the plurality of instances of the service to be upgraded according to an availability zone order (analogous to a computing zone order) specifying that a node in the first availability zone is to be secured before a node in the second availability zone, where upgrading a first instance of the plurality of instances includes deploying a first node-securing pod (e.g., placeholder pod 514A) to secure a first node for the first availability zone; upon the first node being secured by the first node-securing pod for the first availability zone, deploying a second node-securing pod (e.g., placeholder pod 514B) to secure a second node for the second availability zone; and after the first and second node-securing pods have secured the first and second nodes, deploying an updated instance to the first and second nodes to upgrade the first instance.

The computer system may employ a container management system, where the first and second node-securing pods operate within the context of a container management system, and where the availability zone order for securing nodes is enforced by specifying affinity rules and anti-affinity rules within the container management system for the first and second node-securing pods. Furthermore, the use of a container management system allows for flexibility in the use of cloud computing systems, as same program instructions are, in some cases, executable to upgrade software instances within the context of a plurality of different cloud computer systems. In some instances, the first and second availability zones contend for a common pool of nodes available within the particular cloud region, potentially causing node contention issues.

The various techniques described herein, including method 600, and all disclosed or suggested variations, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. One such environment in which the disclosed techniques may operate is a cloud computer system. A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

One common component of a cloud computing system is a data center. As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. In many cases, they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application

What is claimed is:

1. A method for preventing deadlock when upgrading a plurality of instances of a service that is distributed across a plurality of computing zones, the method comprising:
  receiving, by a cloud computer system, an upgrade request to upgrade the plurality of instances, a given one of which is implemented across the plurality of computing zones that includes a first computing zone and a second computing zone; and
  in response to the upgrade request, performing, by the cloud computer system, respective upgrade processes for the plurality of instances at least partially in parallel, wherein respective portions of upgrade processes for the plurality of instances are performed using a node acquisition procedure in which a given instance is upgraded by acquiring nodes in different ones of the plurality of computing zones according to a computing zone order such that nodes in the second computing zone cannot be acquired until acquiring one or more nodes in the first computing zone, wherein the upgrade process for a particular one of the plurality of instances includes:
    after acquiring the nodes in the different computing zones according to the computing zone order, deploying an updated instance to the acquired nodes to update the particular instance.

2. The method of claim 1, wherein the node acquisition procedure is part of a blue-green deployment in which a set of existing nodes for the particular instance are deactivated after deploying the updated instance.

3. The method of claim 2, wherein the computing zone order specifies a constraint on parallelization for those portions of the respective upgrade processes that implement node acquisition, and wherein other portions of the upgrade processes are performed in parallel without such constraints.

4. The method of claim 3, wherein the constraint on parallelization is specified by the computing zone order and permits full parallelization of portions of the respective upgrade processes that implement node acquisition when there is no contention for nodes in the plurality of computing zones.

5. The method of claim 1, wherein the plurality of computing zones includes a third computing zone, and wherein the given instance is further upgraded by acquiring nodes in different ones of the plurality of computing zones according to the computing zone order such that nodes in the third computing zone cannot be acquired until acquiring one or more nodes in the second computing zone.

6. The method of claim 1, wherein the plurality of computing zones includes a first plurality of computing zones in a first cloud region and a second plurality of computing zones in a second cloud region.

7. The method of claim 1, wherein performing the respective upgrade processes is managed by a continuous delivery platform, and wherein acquiring of the nodes in the different computing zones for the particular instance is performed by a container management system.

8. The method of claim 7, wherein the container management system is executable to launch separate computing environments to acquire respective nodes for each of the plurality of computing zones.

9. The method of claim 8, wherein rules are specified for the separate computing environments that enforce the computing zone order.

10. The method of claim 9, wherein the container management system is KUBERNETES, wherein the separate computing environments are node-securing placeholder pods that are not stateful, and wherein the rules include affinity rules and anti-affinity rules.

11. A non-transitory computer-readable medium having program instructions stored thereon that are capable of being executed by a cloud computer system to perform operations comprising:
  receiving an upgrade request to upgrade a plurality of instances, a given one of which is implemented across a plurality of computing zones that includes a first computing zone and a second computing zone; and
  in response to the upgrade request, initiating respective upgrade processes for the plurality of instances, wherein the respective upgrade processes include a node acquisition portion having a common constraint on parallelization in which nodes for a given one of the plurality of instances are to be acquired in different computing zones according to a specified order such that nodes in the second computing zone cannot be acquired until acquiring one or more nodes in the first computing zone, and wherein a given one of the respective upgrade processes further includes:
    after acquiring the nodes in the different computing zones according to the specified order, deploying an updated instance to the acquired nodes to update the given instance.

12. The computer-readable medium of claim 11, wherein the respective upgrade processes implement a blue-green deployment scheme in which existing nodes in the plurality of computing zones are deactivated upon an updated instance being deployed.

13. The computer-readable medium of claim 11, wherein one or more nodes for a given computing zone and instance are acquired using a dedicated process, and wherein the dedicated process is executable to stall until a sufficient number of nodes are available for assignment to the given computing zone.

14. The computer-readable medium of claim 13, wherein the dedicated process is a node-securing pod of a container management system.

15. The computer-readable medium of claim 14, wherein the specified order is enforced via affinity and anti-affinity rules.

16. The computer-readable medium of claim 11, wherein the plurality of computing zones includes separate data centers.

17. A non-transitory computer-readable medium having program instructions stored thereon that are capable of being executed by a computer system to perform operations comprising:
  receiving a request to upgrade a plurality of instances of a service, wherein a given one of the plurality of instances is distributed across a plurality of availability zones that includes a first availability zone and a second availability zone within a particular cloud region;
  causing the plurality of instances of the service to be upgraded according to an availability zone order specifying that a node in the first availability zone is to be secured before a node in the second availability zone, wherein upgrading a first instance of the plurality of instances includes:
    deploying a first node-securing pod to secure a first node for the first availability zone;
    upon the first node being secured by the first node-securing pod for the first availability zone, deploying a second node-securing pod to secure a second node for the second availability zone; and after the first and second node-securing pods have secured the first and second nodes, deploying an updated instance to the first and second nodes to upgrade the first instance.

18. The computer-readable medium of claim 17, wherein the same program instructions are executable to upgrade software instances within the context of a plurality of different cloud computer systems.

19. The computer-readable medium of claim 17, wherein the first and second node-securing pods operate within the context of a container management system, and wherein the availability zone order for securing nodes is enforced by specifying affinity rules and anti-affinity rules within the container management system for the first and second node-securing pods.

20. The computer-readable medium of claim 19, wherein the first and second availability zones contend for a common pool of nodes available within the particular cloud region.

* * * * *